United States Patent
Chan et al.

(10) Patent No.: US 6,282,637 B1
(45) Date of Patent: Aug. 28, 2001

(54) PARTIALLY EXECUTING A PENDING ATOMIC INSTRUCTION TO UNLOCK RESOURCES WHEN CANCELLATION OF THE INSTRUCTION OCCURS

(75) Inventors: Jeffrey Meng Wah Chan, Mountain View; Marc Tremblay, Menlo Park, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/204,760

(22) Filed: Dec. 2, 1998

(51) Int. Cl.⁷ .................................................. G06F 13/00
(52) U.S. Cl. ..................... 712/223; 711/147; 710/200; 709/104
(58) Field of Search ................................ 714/19; 710/200, 710/107–108, 100, 22–23, 1; 711/163, 141, 145–147, 150–152, 155; 709/104, 200, 210; 707/1, 8; 712/203, 223

(56) References Cited

U.S. PATENT DOCUMENTS

| | | | |
|---|---|---|---|
| 4,488,217 | * 12/1984 | Binder et al. ........................ | 710/200 |
| 5,168,564 | * 12/1992 | Barlow et al. ........................ | 714/19 |
| 5,175,829 | * 12/1992 | Stumpf et al. ........................ | 712/203 |
| 5,276,847 | * 1/1994 | Kohn .................................... | 711/163 |
| 5,499,356 | 3/1996 | Eckert et al. ........................ | 395/479 |
| 5,524,255 | 6/1996 | Beard et al. ........................ | 379/123 |
| 5,574,922 | 11/1996 | James ................................... | 395/561 |
| 5,787,486 | * 7/1998 | Chin et al. ........................... | 711/163 |
| 5,968,157 | * 10/1999 | Joy et al. ............................. | 710/200 |

FOREIGN PATENT DOCUMENTS

0529536A2   3/1993  (EP).

OTHER PUBLICATIONS

Paez–Monzon G., et al, "The RISC Processor DMN–6: A unified Data–Control Flow Architecture," Computer Architecture News, US, Association for Computing Machinery, New York, Vol. 24, No. 4, Sep. 1, 1996, pp. 3–10 XP000639693 ISSN: 0163–5964.

* cited by examiner

Primary Examiner—Meng-Al T. An
Assistant Examiner—Wen Ja Lin
(74) Attorney, Agent, or Firm—Skjerven Morrill MacPherson, LLP; Robert C. Strawbrich

(57) ABSTRACT

When an atomic instruction executed by a computer processor locks a memory location, the locking is performed before the processor has determined whether the instruction is to be executed to completion or canceled. The memory location is unlocked whether or not the instruction will be canceled. Since the locking operation can occur before it is known whether the instruction will be canceled, the reading of the memory location can also occur early, before it is known whether the instruction will be canceled.

18 Claims, 3 Drawing Sheets

PARTIALLY EXECUTING A PENDING ATOMIC INSTRUCTION TO UNLOCK RESOURCES WHEN CANCELLATION OF THE INSTRUCTION OCCURS

BACKGROUND OF THE INVENTION

The present invention relates to execution of instructions that lock and unlock computer resources.

Examples of instructions that lock and unlock computer resources are a test-and-set instruction and a swap instruction, and a cas (compare and swap) instruction. A test-and-set instruction reads a memory location (to perform a test) and also writes the memory location (to perform a "set" operation). This instruction is used to implement semaphores and other software synchronization mechanisms. A swap instruction swaps the contents of a memory location and a register. A cas instruction compares a memory location with a register R1, stores the memory location value in register R2, and if the comparison was successful, the instruction also stores the previous value of the register R2 in the memory location. Each of these instructions involves reading and writing a memory location. If between the reading and writing operations another instruction, executed by a different processor, writes the same memory location, the program executing the test-and-set or swap instruction and/or the program executed by the different processor may provide incorrect results. Therefore, the test-and-set and swap instructions are implemented as atomic instructions. These instructions lock the memory location during the reading operation to prevent other processors from writing the location. The location is unlocked when the memory location is written.

It is desirable to enable faster execution of instructions that lock and unlock computer resources.

SUMMARY

Some embodiments of the present invention allow fast execution of instructions that lock and unlock computer resources. In particular, an instruction is allowed to lock a computer resource before it becomes known whether the instruction will be executed to completion or canceled. By the time the instruction processing is complete, the resource becomes unlocked whether or not the instruction is canceled.

An instruction may have to be canceled if, for example, a trap condition occurs while the instruction is being executed. If the instruction is canceled after locking a computer resource but before unlocking the resource, the resource may become permanently locked, which is undesirable.

One solution to this problem is not to allow an instruction to lock a resource until it is determined that the instruction will be executed to completion. However, this delays instruction execution.

Therefore, according to the present invention, an instruction is allowed to lock a resource before it is determined whether the instruction will be executed to completion or canceled. Later in the instruction processing, the resource is unlocked even if the instruction is canceled, and even if the fact that the instruction is canceled is established by the processor before the instruction has unlocked the resource.

In some atomic instruction embodiments for which the resource is a memory location, the instruction is allowed to read the memory location before it is known whether the instruction will be canceled. Performing the reading operation early speeds up the instruction execution.

In some pipelined embodiments, the determination of whether or not an instruction is to be canceled is made before the pipeline stage or stages in which the instruction results are written to their destinations (e.g., architecture register or memory). If an instruction is canceled, writing to the destination(s) is suppressed. However, the instruction still goes through all the pipeline stages at least up to, and including, the stage in which the resource is unlocked. In some embodiments, the instruction goes through all the pipeline stages, but writing to the destinations is suppressed.

In some embodiments, the processor shares a cache with one or more other processors. The resource being locked is a cache memory location.

Other features and advantages of the invention are described below. The invention is defined by the appended claims.

DETAILED DESCRIPTION

A multiprocessor system 110 (FIG. 1) includes two processors (CPUs) 120.1, 120.2 which share a two-port data cache unit (DCU) 130. Each CPU 120 accesses the DCU through a respective one of the DCU ports. DCU 130 caches data from memory 140.

Data cache 130 includes a set-associative cache memory 130M and control logic (not shown) to access the cache memory. Such caches are known in the art. Each cache set 130L in memory 130M can store a number of data words W0, W1, . . . . (thirty-two 32-bit words in some embodiments). In addition, each cache set 130L includes a lock bit L which indicates whether the cache set is locked, and a processor bit P which indicates which CPU has locked the cache set. When the cache set is locked, the cache set can be accessed only from the port connected to the CPU that has locked the cache set. The other CPU is not allowed to read or write the cache set or those memory 140 locations whose contents are cached in the cache set.

In some embodiments, if a cache set 130L is locked by one CPU, the other CPU is allowed to read the cache set but not to write the cache set.

Figures 1, 2:
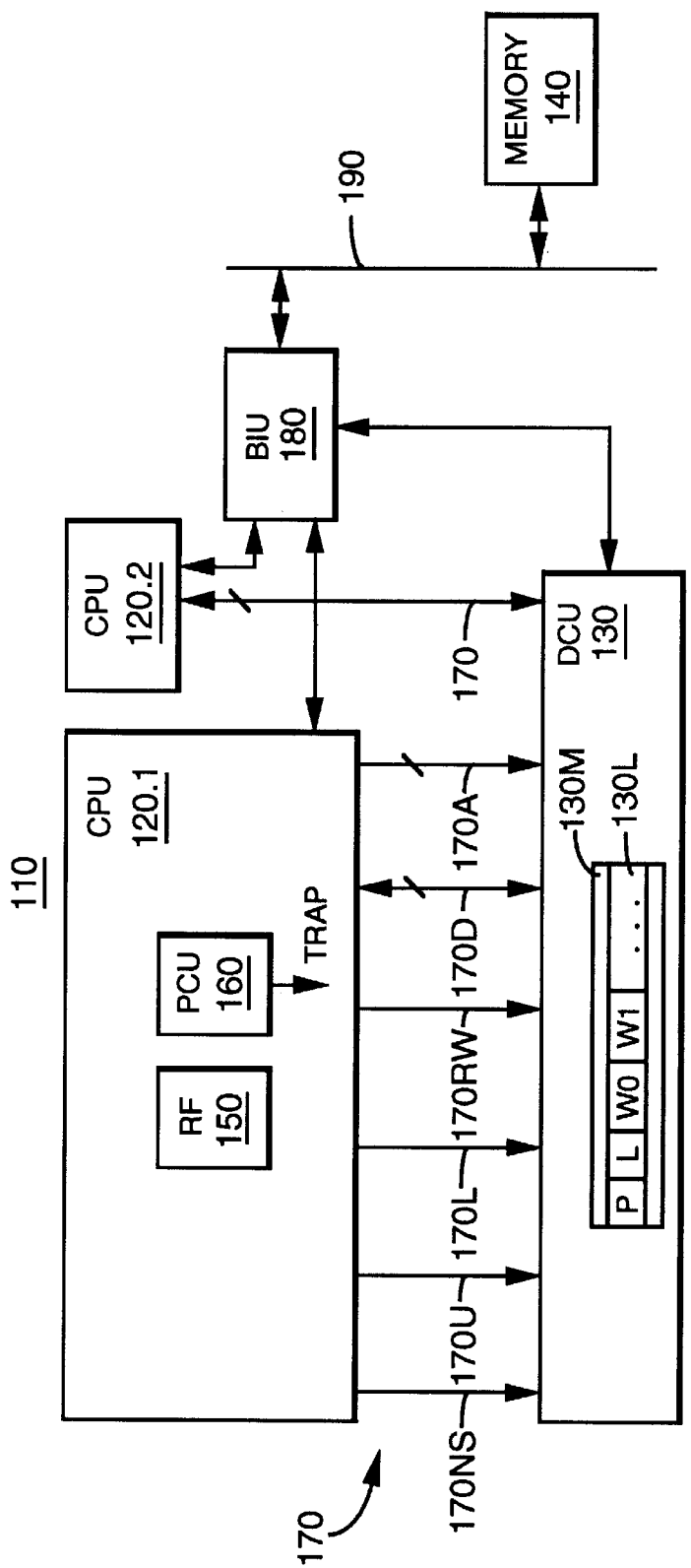
FIG. 1 is a block diagram of a multi-processor system according to the present invention.
FIG. 2 illustrates an instruction execution pipeline of a processor of FIG. 1.

FIG. 2 illustrates instruction execution pipeline for a single CPU 120 in some embodiments. In some embodiments, the two CPUs are identical, but the pipeline stages do not have to be synchronized between the CPUs. In particular, a pipeline disruption of one CPU does not affect the other CPU's pipeline.

In FIG. 2, "F" is an instruction fetch stage. "A" is an alignment stage for embodiments in which the CPUs are VLIW (very long instruction word) processors. In a VLIW processor, each instruction may include a number of sub-instructions executed in parallel by different execution units. In the alignment stage A, the sub-instructions are aligned before the respective execution units.

In the D/R stage (decode/register file access), each execution unit decodes its respective sub-instruction and reads operands from register file 150 (FIG. 1).

In execution stages E, C(A1), A2, A3, the sub-instructions are executed. In stage T, trap events are handled. "E" stands for effective address calculation, "C" for cache access, A1, A2, A3 for annex 1, 2, 3. Depending on the instruction, some stages may be unnecessary for instruction execution, but are inserted as padding to delay the trap stage T so that there are always three clock cycles between stages E and T.

The operations performed during stages E, C(A1), A2, A3 vary from instruction to instruction. For example, some instructions (such as NOP) do not perform effective address calculation.

In the write back stage WB, the instruction results are written to their destinations which may include register file 150 (FIG. 1), DCU 130, memory 140 (if the destination is a non-cacheable memory location), or other devices or bus lines.

In stage T, the processor's pipe control unit (PCU) 160 (FIG. 1) generates a "trap" signal indicating whether the VLIW instruction (and hence all its sub-instructions) has to be canceled due to a trap condition caused by the instruction itself or by an interrupt. The instruction (say instruction) "I1" can also be canceled by a trap condition caused by a previous instruction "I2" if execution of I1 and execution of I2 overlaps. The trap condition caused by "I2" causes the trap signal to be asserted in the T stage of I2 which is an earlier pipeline stage of instruction I1. Trap conditions are listed in Addendum 1 at the end of this description for some embodiments. If the "trap" signal is asserted in the T stage or an earlier pipeline stage of instruction I1, the I1 results are not written to the destination in the WB stage. However, the instruction I1 is allowed to proceed to the WB stage, and any cache set that has been locked by the instruction is unlocked in the WB stage.

Additional execution stages are inserted between A3 and WB if needed.

In some embodiments, each CPU 120 has a register file and a PCU, but in FIG. 1 the register file and the PCU are shown only for CPU 120.1 for simplicity.

Addendum 2 is a pseudocode listing illustrating execution of an atomic instruction by a CPU 120. We will describe Addendum 2 with reference to CPU 120.1. Execution of atomic instruction by CPU 120.2 is similar.

At step 310, CPU 120.1 issues a load-with-lock request to DCU 130. This is done as follows. Each CPU is connected to its respective DCU port by a bus 170 (FIG. 1). only the bus 170 for CPU 120.1 is shown in detail. Each bus 170 includes address lines 170A, data lines 170D, read/write line 170RW, lock line 170L, unlock line 170U, and no_store line 170NS.

At step 310, CPU 120.1 drives the address lines 170A of its bus 170 with the address of the data to be loaded (the address in memory 140), and drives a read signal on read/write line 170RW. In addition, the CPU asserts the lock line 170L to cause the DCU to lock the cache set being read.

Because the cache set can be unlocked in the WB stage even if the instruction has to be canceled, step 310 can be performed before the instruction's T stage, that is, before it becomes known whether or not the instruction will be canceled.

If the data requested at step 310 are in the cache, and the cache set has not been locked by CPU 120.2, the DCU returns the data on lines 170D. Otherwise, the DCU asserts appropriate controls signals (not shown) to CPU 120.1 to signal that the cache set is locked or the data are not in the cache, whatever the case may be. If the data are not in the cache, CPU 120.1 issues a request to bus interface unit (BIU) 180 to fetch the data from memory 140. BIU 180 fetches the data via bus 190. When the data are fetched, they are cached in a cache set 130L in DCU 130 and are also provided to CPU 120.1. In addition, the lock bit L is set in the cache set, and the processor bit P is made to indicate CPU 120.1.

At step 320, CPU 120.1 calculates a store condition "COND" which determines whether the memory 140 location read at step 310 has to be written by the instruction. Step 320 is omitted for some instructions, such as swap, for which the memory location is written unconditionally.

Step 350 is completed in the WB stage (though this step may start before the WB stage in some embodiments). This step includes steps 350A, 350B. At step 350A, CPU 120.1 issues a store request to DCU 130, driving the store address on lines 170A, the store data on lines 170D, and the write signal on line 170RW, as known in the art. In addition, CPU 120.1 asserts the unlock line 170U to cause the DCU to unlock the cache set 130L.

At the same time, at step 350B, CPU 120.1 drives the no_store line 170NS with a signal indicating whether the store data are to be actually written to the cache set. The data will not be written if, and only if: (1) "trap" was asserted in the T stage or earlier stage of the instruction, or (2) the condition COND is false.

Whether or not no_store is asserted, DCU 130 will reset the L bit to unlock the cache set.

Further details of one embodiment will be illustrated on the example of an atomic compare-and-swap instruction cas (Addendum 3). This instruction takes three operands rd, rs1, rs2. In some embodiments, these operands are addresses of registers in register file 150.

At step 410, the instruction reads a memory location M[rs2] whose address is stored in register rs2. This location is in memory 140. (The instruction definition of Addendum 3 does not depend on the presence of a cache.) At step 420, the contents temp_rs2 of the memory location are compared with the contents r[rs1] of register rs1. If the comparison is successful, the memory location M[rs2] is written with the contents r[rd] of register rd.

Whether or not the comparison is successful, the register rd is written with the memory location contents temp_rs2 (step 430) fetched at step 410.

Addendum 4 illustrates execution of the cas instruction by a CPU 120. The step reference numbers correspond to those of Addendum 2. At step 310 in Addendum 4, the contents of memory location M[rs2] are fetched from cache 130 and placed into a temporary register temp_rs2. The cache set storing M[rs2] is locked. Register temp_rs2 is not an "architecture" register, that is, this register is not visible by software and this register can by modified even if the cas instruction will be canceled.

At step 314, register rd is read into another non-architecture register temp_rd.

At step 320, another non-architecture register COND is written with a bit indicating whether temp_rs2=r[rs1].

Steps 310, 314, 320 can be performed before the T stage. These steps can overlap or be performed in an order different from the order shown.

Step 350, consisting of steps 350A, 350B, 350C, is to be completed after the T stage. At step 350A, a store-withunlock is issued to the DCU to store the contents of temp_rd in the cache location that caches M[rs2]. Step 350B is performed as in Addendum 2. At the same time, at step 350C, if "trap" has been deasserted in the T and all earlier stages of the cas instruction, then the contents of temp_rs2 are written to register rd to implement step 430 of Addendum 3.

Figure 3:
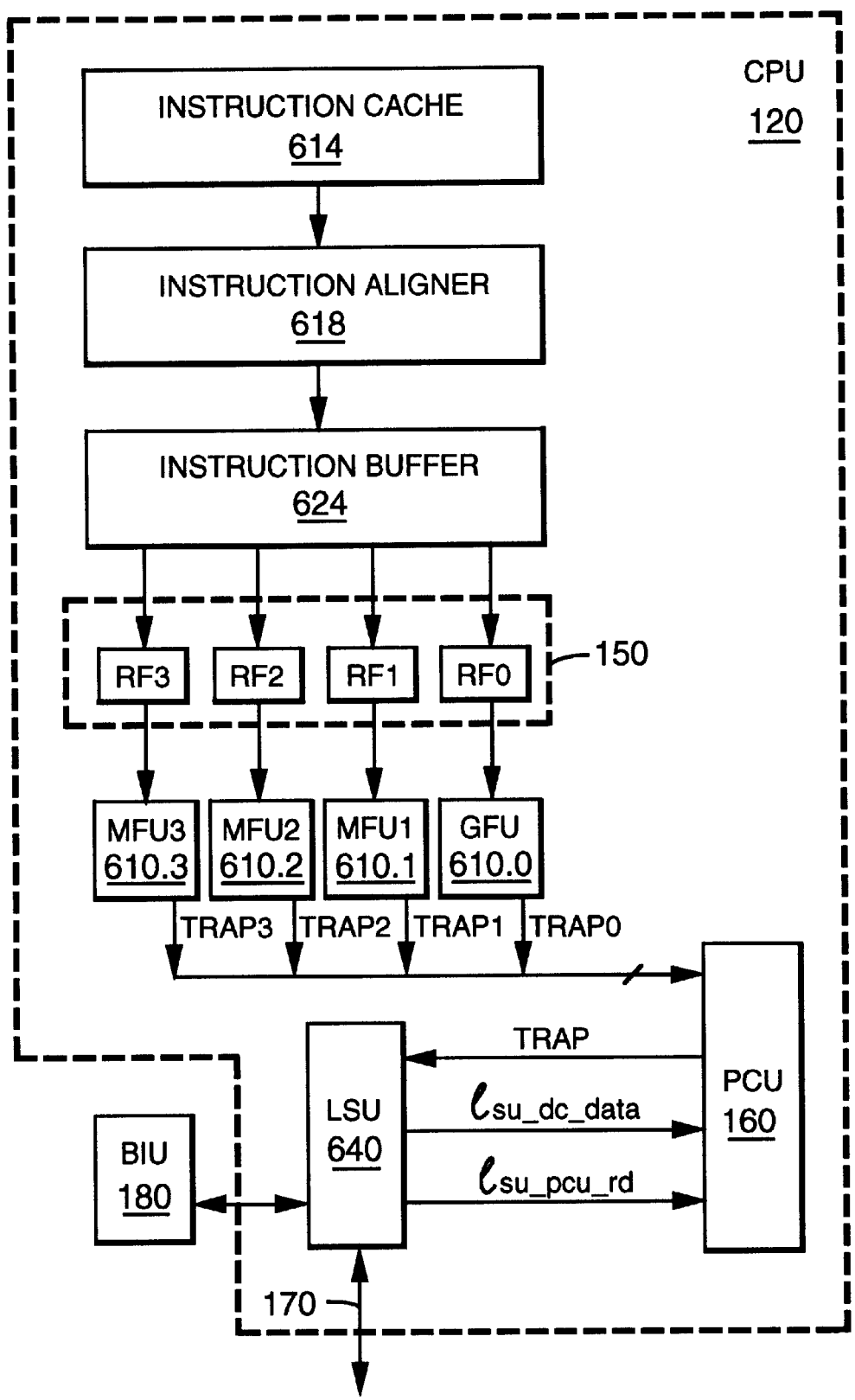
FIG. 3 is a block diagram of one embodiment of a processor of FIG. 1.

FIG. 3 illustrates one embodiment of a CPU 120 in more detail. CPU 120 is a VLIW processor having four execution units 610.0, 610.1, 610.2, 610.3, also labeled GFU, MFU1, MFU2, MFU3 respectively. GFU stands for "general functional unit". MFU stands for "media functional unit". The four execution units operate in parallel to execute a single VLIW instruction which may include up to four sub-instructions. Instruction cas is a sub-instruction.

The GFU is the only execution unit that can perform memory access operations, including cas.

During the pipeline fetch stage F (FIG. 2), the CPU fetches instructions from instruction cache 614 into instruction aligner 618. During the A stage, instruction aligner 618 extracts up to four sub-instructions from cache 614 and aligns the sub-instructions before respective execution units 610. The sub-instructions are written into instruction buffer 624. During the D stage, units 610 decode their respective sub-instructions and, if needed, read instruction operands from respective register files RF0, RF1, RF2, RF3 which form the register file 150. Each register file RF0, RF1, RF2, RF3 stores a copy of the same data.

In the execution stages E, C(A1), A2, A3, and possibly other stages after A3 and before WB, each execution unit 610 executes its respective sub-instruction.

In stage WB, execution units 610 write instruction results, as explained above.

When a VLIW instruction is in its T stage, each execution unit 610.0–610.3 generates a respective signal "trap0" through "trap3" to indicate whether the execution unit detected a trap condition. Signals trap0–trap3 are provided to PCU 160. In the same stage T, the PCU asserts, "trap" signal if, and only if, any one of signals trap0–trap3 is asserted in the T stage.

The "trap" signal is provided to load/store unit (LSU) 640.

LSU 640 executes requests to access cache 130, BIU 180, and other devices. In LSU 640, store buffer 710 (FIG. 4) is a queue of eight entries 0–7. Entry 0 is the front (bottom) of the queue, entry 7 is the back (or top). The store instructions are written from GFU 610.0 into entry 7 in the E stage. (An entry in store buffer 710 defines a store operation which we will call a "store instruction". Similarly, an entry in load buffer 720 of LSU 640 defines a load operation which we will call a "load instruction". These store and load instructions should not be confused with sub-instructions executed by units 610 or with VLIW instructions.)

At the end of the C stage, the instruction in entry 7 of the store buffer 710 is written to the lowest empty entry chosen from entries 4–7.

A store instruction is not dispatched from the store buffer to the DCU until the stage A3. (Dispatching the instruction involves providing the address, data and control signals on bus 170 of FIG. 1.) When a store instruction is dispatched to the DCU, the DCU writes cache memory 130M at least one cycle after the dispatch. If the instruction was dispatched at stage A3 but in stage T the "trap" signal is asserted, the instruction is canceled via a cancellation signal (not shown) sent by the LSU to the DCU in the T stage.

In each store buffer entry, "datab" field 710D holds the store data. Address field 710A ("addrb") holds the store address which is an address in memory 140.

State field 710S indicates the pipeline stage of the instruction. The binary encoding of the stage field is as follows:
  100: instruction is in stage A2;
  010: instruction is in stage A3;
  001: instruction is in stage T;
  000: instruction is past the T stage.

The stage field is written at the end of the C stage and is thereafter shifted right once per clock cycle. Entries 4–7 of the store buffer keep all the three bits of the stage field. Entry 3 has two bits to track whether the instruction is in stage A3 or T or is past T. Entry 2 has one bit to track if the instruction is in stage T or past the T stage. Entries 0 and 1 do not have the stage field.

The instruction type field 710T indicates the instruction type. In particular, this field indicates whether the store is part of a cas instruction.

One-bit load/store field 710L is used for cas instructions to track if the cas load has been performed, as described below.

Figure 4:
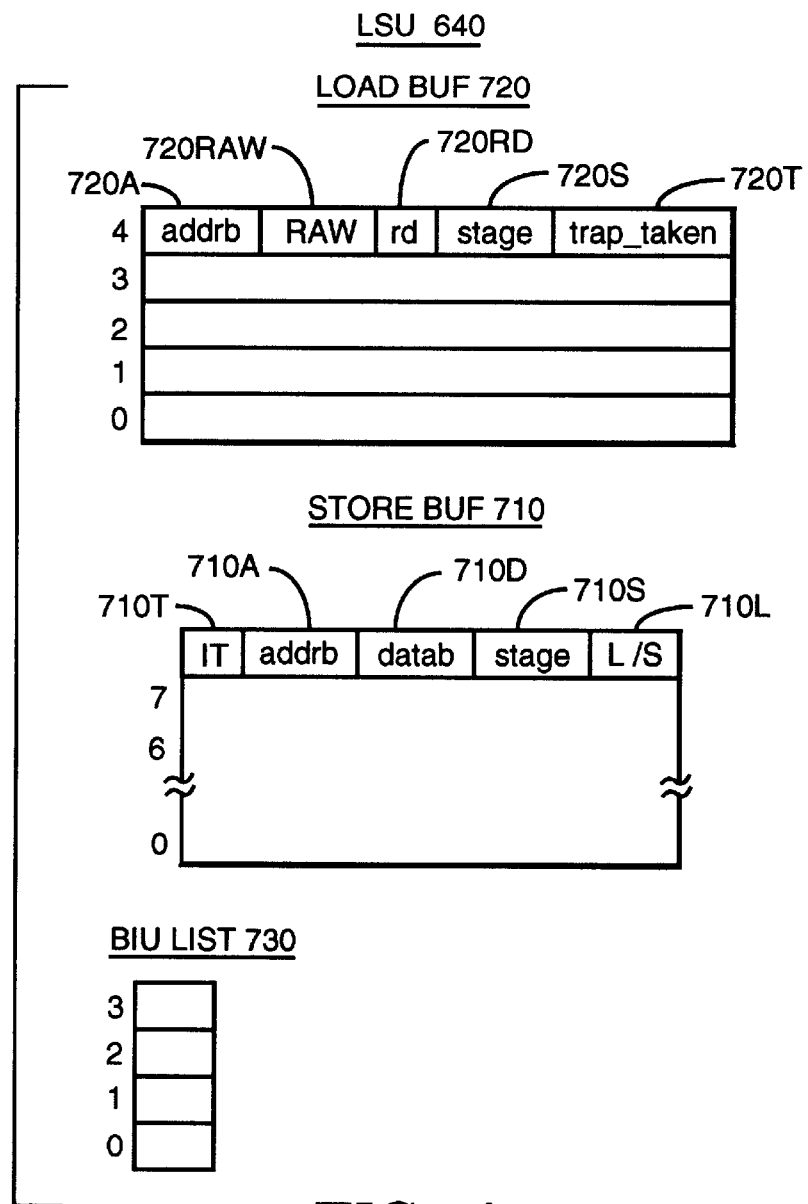
FIG. 4 is a block diagram of a load/store unit for one embodiment of the processor of FIG. 3.

Load buffer 720 in FIG. 4 is a queue of five entries 0–4. Entry 0 is the front of the queue, and entry 4 is the back. Load instructions are written from GFU 610.0 to entry 4 in the E stage. They shift through the buffer from top to bottom. Each instruction remains in the load buffer through its lifetime in the LSU, that is, even after the load request has been issued to DCU 130. After the load data have returned from the DCU, the instruction is logically deleted from the load buffer.

The load buffer entries can be finished (i.e. respective loads can be performed) out of order. Holes in the buffer from out-of-order completed instructions can be filled from any entry, one per clock cycle.

A load instruction can be dispatched to the DCU in the E stage without being written to the load buffer first. However, the instruction still gets written into the load buffer.

In each load buffer entry, "addrb" field 720A holds the load address. This is an address in memory 140. The address is calculated in the E stage (the address may be equal to the sum of two operands, as known in the art.) Destination register specifier field 720RD holds the address of the load destination register in register file 150.

RAW hazard field 720RAW is an 8-bit vector pointing to store buffer 710 instructions which must be performed before the load instruction to avoid a RAW (read after write) hazard. In the embodiment being described, the stores are issued in order with respect to each other. The loads are also issued in order with respect to each other. However, the loads are also issued in preference to the stores. The store instructions are dispatched only when the first load in load buffer 720 cannot be dispatched due to a RAW hazard, or when the load buffer is empty. Therefore, a RAW (read after write) hazard is a possibility, but RAR, WAR, and WAW hazards are not.

Each bit in field 720RAW corresponds to an entry of store buffer 710. The bit is set if the instruction in the corresponding store entry must be executed before the load, and the bit is reset otherwise. As the store buffer entries are shifted down to fill the free space in the store buffer, the RAW fields 720RAW are shifted to the right.

A load instruction can be speculatively dispatched to DCU 130 in the E stage even though the corresponding RAW hazards are not calculated until the C stage. If the load is found to have a hazard, the load is canceled (that is, the data returned by cache 130 are discarded), and the load is retried later.

The load can also be canceled by a "trap" signal generated in the T or earlier stage if the load was dispatched to the DCU before the T stage. In this case, the load is not retried.

One-bit field 720T ("trap_taken") is initially set to zero. This bit is set to 1 in the T or earlier stage in response to the trap signal from PCU 160 being asserted. If the bit is set, the instruction will be removed from the load buffer when the load data return, and the load data will be discarded.

The stage field 720S has the same meaning as the field 710S in the store buffer, and the encoding is the same. When the load data are passed back to GFU 610.0, the stage field final value, shifted right once more, is passed to PCU 160.

Entry 4 of load buffer 720 includes all the three stage bits 720S. Entry 3 has two bits to track whether the instruction is in stage A3, T, or past T. Entry 2 has one bit to track whether the instruction is in stage T or past T. Entries 1 and 0 do not have the stage field.

BIU list 730 is a queue of commands to be dispatched to bus interface unit 180. The BIU list is written when DCU 130 returns a cache miss and when, therefore, data have to be fetched into the cache from memory 140. The BIU list is also written to write the memory 140.

Figure 5:
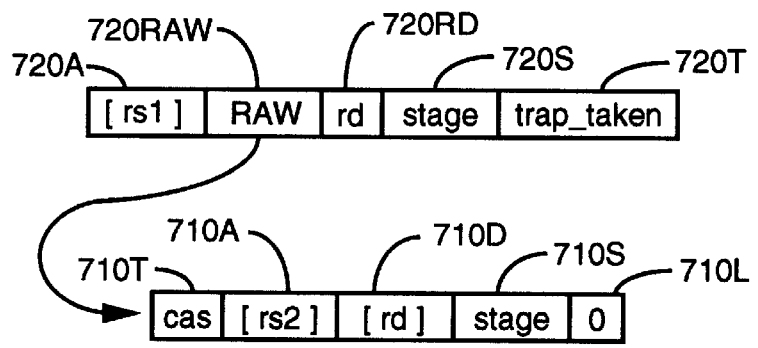
FIG. 5 illustrates entries in load and store buffers of FIG. 4.

When GFU 610.0 issues a cas instruction to LSU 640, the LSU writes one entry into each of buffers 720, 710. The entries are shown in FIG. 5. In the store buffer entry, the instruction type field 710T indicates cas. Address field 710A has the contents of register rs2 (Addendum 3) of the cas instruction, i.e. the memory 140 address. The data field 710D has the contents of the destination register rd (Addendum 3) of the cas instruction. The bit 710L is 0 to indicate that the cas load has not been performed yet.

In the load buffer entry, the address field 720A receives the contents of register rs1 (the comparison data). See Addendum 3. Field 720RD receives the address of the destination register rd (Addendum 3) of the cas instruction. In RAW vector 720RAW, the bit pointing to the store entry for the cas instruction is set even though the cas load is to precede the cas store. In addition, the bits corresponding to other RAW hazards, if any, are set.

The remaining fields of the cas load and store entries of FIG. 5 are defined as for other load and store instructions.

Addendum 5 describes the LSU operation in pseudocode. BIU list 730 has the highest priority in some embodiments. If the BIU list 730 is not empty, the LSU dispatches an operation from the BIU list (step 910).

If the BIU list is empty, an operation from load buffer 720 or store buffer 710 is dispatched. If the first entry (i.e., the entry in the front of the queue) in load buffer 720 has no RAW hazard (step 920), the entry is dispatched. More particularly, the LSU dispatches to DCU 130 a load-without-lock request, that is, a read request with lock signal 170L deasserted (step 920A). When DCU returns data on lines 170D (step 920B), the LSU passes the data to PCU 160 and GFU 610.0 on bus lsu_dc_data (FIG. 3). The LSU also passes to the PCU and the GFU on bus lsu_pcu_rd the destination register specifier rd from field 720RD (FIG. 4). The LSU also passes to the PCU the stage bits 720S and the trap taken bit 720T.

If load buffer 720 is empty, or the first entry in the load buffer has a non-zero bit in field 720RAW, the first store in store buffer 710 is dispatched (step 930). If the instruction type field 710T of this entry does not indicate a cas instruction (step 930A), then a store request is issued to DCU 130, with the lock and unlock signals 170L, 170U deasserted. The instruction is dispatched in stage A3 or later. The stage is indicated by the stage field 710S or by the position of the instruction in the store buffer.

If the field 710T indicates a cas instruction (step 930B), the actions in Table 5-1 are performed.

In the table, the column "CAS STAGE" indicates the pipeline stage of the cas instruction for one example. In that example, both LSU buffers were empty when the cas instruction was issued by GFU 610.0. Therefore, the cas load (step 93OB1) is dispatched to DCU 130 in the E stage.

The column "LSU PIPE STAGE" indicates the LSU pipeline stages. LSU 640 is pipelined, and can issue a request to the DCU on every clock cycle.

At step 930B1 (LSU pipeline dispatch stage LD), a load request is dispatched using the store buffer 710 entry for the cas instruction. Using the store buffer entry rather than the load buffer entry allows utilization of the same logic as used for non-cas instructions to select an instruction for dispatch. Indeed, the cas load entry has a RAW hazard bit set (pointing to the cas store entry). Therefore, according to the non-cas rules, the cas store must be dispatched before the cas load.

When the LSU dispatches the cas store entry with field 710T showing cas and bit 710L reset, the LSU dispatches a load request rather than a store to the DCU.

In the load request, the memory address in field 710A is driven on the DCU address bus 170A. The lock signal 170L is asserted, and the unlock signal 170U is deasserted.

At step 930B2, in stage C, the DCU returns data on lines 170D (assuming a cache hit). The LSU sets the bit 710L to indicate that the cas load has been performed.

The LSU pipeline stages at step 930B2 are indicated as LC (LSU cache access) and LF (LSU finish). In the embodiment being described, these stages may or may not occur in the same clock cycle. For example, if the DCU returned a cache miss, the stage LF (data return on lines 170D) would be performed later.

Of note, in case of a cache miss, the DCU does not lock the cache set, and the LSU does not set the bit 710L. In this case (not shown in Table 5-1), the LSU causes BIU 180 to fetch data from memory 140, and then reissues the load-and-lock request of step 930B1.

When the DCU returns data on lines 170D, the LSU 640 drives the destination register specifier rd on lines lsu_pcu_rd to PCU 160 and GFU 610.0. The register specifier rd is taken from field 720RD of the cas load entry (see FIG. 5). In some embodiments, the LSU finds the cas load entry as the first load in the queue of load buffer 720. Indeed, because the loads have priority over stores, a store is issued before a load only if the load has a RAW bit set, stores are issued in order with respect to each other, and loads are issued in order with respect to each other, the cas load is the first load in the load buffer.

In other embodiments, the cas load entry is found by the LSU as the first load having a RAW vector 720RAW pointing to the cas store entry.

At step 930B3, the LSU again finds the load buffer entry corresponding to the cas instruction, and drives the comparison data (contents of register rs1) from field 720A (FIG. 5) to GFU 610.0. At this time, the data from the DCU are still available on bus lsu_dc_data. The GFU performs the comparison step 320 (Addendum 4), and provides the result COND to LSU 640. This occurs in pipeline stage A2 in Table 5-1, when the LSU pipeline for the cas instruction is in stages LL (LSU late cache response) and LI (LSU invalidate, meaning that the instruction can be invalidated in this stage). Stages LL, LI may occur in the same clock cycle or in different cycles. They occur in the same cycle in Table 5-1.

At step 930B4 (cas stage A3 in Table 5-1, LSU stage LD), the LSU again selects an entry for dispatch to the DCU. Since the first load in the load buffer is a cas load, having a RAW bit set, a store is dispatched. The first store is still the cas store. However, since its bit 710L is set, the LSU dispatches a store to the DCU, asserting the unlock signal 170U.

At step 930B5 (cas stage T, LSU stage LC), LSU 640 generates the signal no$_{13}$ store on line 170NS (FIG. 1). This signal is asserted if, and only if, the trap taken bit 720T is set (one) or COND is false. See step 350B in Addenda 2 and 4.

At step 930B6 (cas stage WB in Table 5-1), the store operation is allowed to finish. However, if no_store was asserted at step 930B5, the DCU will not perform a store. Whether or not no_store was asserted, the DCU resets the cache set lock bit L.

The above embodiments illustrate but do not limit the invention. In particular, the invention is not limited to the cas instruction. Swap, test-and-set, and other atomic instructions are used in some embodiments. The invention is not limited by the number of the CPUs sharing the cache 130 or by the structure of a CPU. In some embodiments, the CPUs are not identical to one another. Further, in some embodiments, non-CPU entities, for example, a DMA or a communication controller, can share the cache with the CPUs. If a cache set is locked, such entities are prevented from writing and possibly reading the cache set.

In some embodiments, the LSU provides an interface to non-memory devices in addition to the memory. In other embodiments, an LSU is absent from at least one CPU. The invention is not limited to dispatching loads in preference to stores, or to any other dispatch policy.

The invention is not limited by the type of the CPUs. In some embodiments, one or more of the CPUs are non-VLIW processors. In some embodiments, one or more CPUs do not have a register file.

While in some embodiments the memory 140 is a random access memory, in some embodiments the DCU caches data from non-random access memory devices.

In some embodiments, an atomic instruction locks an entire cache memory, or an individual word, bit, or some other cache portion. Some embodiments do not include a cache, and an atomic instruction locks part or all of a non-cache memory.

The invention is not limited to any particular interface between a CPU and the cache. For example, in some embodiments, the lock line 170L and the unlock line 170U are combined into a single line since in some embodiments the lock and the unlock commands are never issued to the DCU simultaneously.

The invention is not limited to caches. In some embodiments, the invention is applied to non-cache resources, for example, disk or communication controllers.

The invention is not limited to the pipeline of FIG. 2 or to any particular pipeline of LSU 640. Further, in some embodiments, an atomic instruction reads one memory location but writes a different memory location. The location being written, or both locations, are locked in some embodiments from the time the first location is read to the time the second location is written.

The steps of Addenda 2–4 are performed not necessarily in the order shown. Some steps may overlap or be performed in a different order.

Other embodiments and variations are within the scope of the invention, as defined by the appended claims.

ADDENDUM 1

Traps

A trap may be caused by an exception or an interrupt. An exception is a condition associated with an instruction being executed. Examples include divide by zero, unaligned memory access, stack overflow, an illegal instruction, a breakpoint or a software interrupt instruction, a privileged instruction executed in a non-privileged mode, a memory map error (attempt to access an unmapped memory address space, or to execute unallowed opcode for an address space), a memory access error (for example, a parity error), an instruction address is out of bounds, data are out of bounds, referencing a null pointer, software-initiated processor reset.

An interrupt is a condition caused by an external device. Interrupts are not directly related to an instruction being executed. Examples of interrupts are requests from a network controller, a keyboard, a joy stick, or a disk controller. Another example is a timer interrupt. Power-on reset (a processor reset signal being asserted) also causes an interrupt.

When a trap condition occurs, the processors stops executing the current instruction stream and starts executing a trap handler. Before the trap handler is started, the instructions that were past the T stage when the trap condition occurred are executed to completion. The instructions that have not yet gone past the T stage are canceled.

ADDENDUM 2

Atomic Instruction Pseudocode
310 CPU issues a load-with-lock request to DCU, possibly before T stage.
320 CPU calculates store condition "COND"
350
  350A CPU issues a store-with-unlock request to DCU, to be completed at WB stage
  350B no_store>- (trap asserted in the T or earlier stage of the instruction) OR ~COND

ADDENDUM 3 cas rd, rs1, [rs2]:
410 temp_rs2>- M[rs2]
420 if temp_rs2=r[rs1], then
  M[rs2]>- r[rd]
430 r[rd]>- temp_rs2

ADDENDUM 4

310 temp_rs2>- M[rs2]; lock the cache set that caches M[rs2]
314 temp_rd>- r[rd]
320 COND>- (temp_rs2 =r[rs1])
350
  350A Issue a store with unlock to DCU:
  M[rs2]>- temp_rd
  350B no_store>- (trap asserted in the T or earlier stage of the instruction) OR~COND)
  350C if ~(trap asserted in the T or earlier stage of the instruction) then r[rd]>- temp_rs2

ADDENDUM 5

LSU Operation Pseudocode
910 If BIU list not empty, dispatch BIU operation
920 Else if load buffer is not empty and the first load instruction in load buffer has no RAW hazard,
  920A Dispatch load-without-lock request to DCU
  920B When DCU returns data on lines 170D,
    920B1 Provide the data on bus lsu_dc_data
    920B2 Provide destination register specifier (load buffer entry field rd) on bus lsu_pcu_rd
930 Else if store buffer is not empty
  930A If field 710T of first store buffer entry does not indicate cas, issue a store request to DCU deasserting the lock signal 170L and the unlock signal 170U
  930B Else (the first store buffer entry is a cas entry):

TABLE 5-1

| STEP | CAS STAGE | LSU PIPE STAGE | ACTION |
|---|---|---|---|
| 930B1 | E | LD | Dispatch load-with-lock request to DCU, with address in store entry field addrb (contents of rs2) |
| 930B2 | C | LC, LF | DCU returns data on lines 170D. Set flag 710L in store buffer entry. Drive load buffer destination register specifier (rd field of load buffer entry) on lines lsu_pcu_rd |
| 930B3 | A2 | LL, LI | Provide to GFU the comparison data r[rs1] from addrb field of load buffer entry. Get COND from the GFU |
| 930B4 | A3 | LD | Dispatch store-with-unlock to the DCU |
| 930B5 | T | LC | no_store <- ((trap_taken bit 720T set) or ~COND)) |
| 930B6 | WB | | Allow the DCU to complete the cas store unlock (and, possibly the data store) |

What is claimed is:

1. A computer processor coupled to one or more computer resources, the processor operable to lock and unlock the resources, the processor operable to execute instructions in an execution pipeline comprising a plurality of sequential stages, said processor further comprising:

means for identifying one or more instructions occupying stages in the pipeline that comprise a first operation performed during execution of the instruction that includes locking one or more of the resources, and a second operation performed during execution of the instruction that includes unlocking one or more of the resources; and means for canceling execution of one or more of the identified instructions in response to a cancellation condition, said means for canceling further comprising:

means for determining for which of the identified instructions execution should be canceled; and means for inhibiting performance of the second operation, except for the unlocking of one or more of the resources, for each of the identified instructions to be canceled and for which performance of the first operation was completed prior to the cancellation condition and regardless of whether performance of the second operation had already commenced prior to the cancellation event.

2. The computer processor of claim 1 wherein said means for determining for which of the identified instructions execution should be canceled further comprises:

means for monitoring which stage each of the identified instructions occupies in the pipeline as a function of time; and wherein only those identified instructions that have not progressed beyond a predetermined stage of the pipeline will be canceled.

3. The computer processor of claim 1 wherein:

the first operation of the identified instructions further comprises reading a memory location and the second operation of the identified instructions further comprises conditionally or unconditionally writing a memory location; and the resource that is locked in performing the first operation is the memory location that is read, and the resource that is unlocked in performing the second operation is the memory location to be written.

4. The computer processor of claim 3 wherein said processor is coupled to a cache, and wherein the memory location to be written is a memory location in said cache.

5. The computer processor of claim 3 wherein the first operation of the identified instructions is performed in a first one of the stages of the pipeline and the cancellation condition occurs in a second one of the stages, and wherein the first stage occurs earlier in the sequence of stages than the second stage.

6. The processor of claim 3 wherein the means for inhibiting is a signal that prevents data from being written to the memory location during performance of the second operation.

7. The processor of claim 5 wherein each of the identified instructions to be canceled proceeds through all of the pipeline stages at least up to, and including, the stage or stages in which the second operation is performed and writing into memory is inhibited.

8. The computer processor of claim 1 further comprising:

a load buffer having a plurality of entries for storing load operations including the first operation of each of the identified instructions;

a store buffer having a plurality of entries for storing store operations, including the second operation of each of the identified instructions; and wherein said means for identifying one or more instructions comprises a bit associated with the first and second operations of each of the identified instructions; and wherein said means for monitoring comprises state bits associated with each of the first and second operations of the identified instructions.

9. The computer processor of claim 8 wherein the load operations, including the first operation of each of the identified instructions, can be performed in a different sequence than the order in which they were received by the load buffer; and wherein store operations and second operations of the identified instructions must be performed in the order in which they are received by the store buffer.

10. A method of executing instructions by a computer processor, the processor coupled to one or more computer resources, the processor operable to lock and unlock the resources, the processor operable to execute instructions in an execution pipeline comprising a plurality of sequential stages, said method comprising the steps of:

identifying one or more instructions occupying stages in the pipeline that comprise a first operation performed during execution of the instruction that includes locking one or more of the resources, and a second operation performed during execution of the instruction that includes unlocking one or more of the resources; and canceling execution of one or more of the identified instructions in response to a cancellation condition, said step of canceling further comprising:

determining for which of the identified instructions execution should be canceled; and inhibiting performance of the second operation, except for the unlocking of one or more of the resources, for each of the identified instructions to be canceled and for which performance of the first operation was completed prior to the cancellation condition and regardless of whether performance of the second operation had already commenced prior to the cancellation event.

11. The method of claim 10 wherein said step of determining for which of the identified instructions execution should be canceled further comprises the steps of:

monitoring which stage each of the identified instructions occupies in the pipeline as a function of time; and wherein only those identified instructions that have not progressed beyond a predetermined stage of the pipeline will be canceled.

12. The method of claim 10 wherein:

the first operation of the identified instructions further comprises reading a memory location and the second operation of the identified instructions further comprises conditionally or unconditionally writing a memory location; and the resource that is locked in performing the first operation is the memory location that is read, and the resource that is unlocked in performing the second operation is the memory location to be written.

13. The method of claim 12 wherein the processor is coupled to a cache, and wherein the memory location to be written is a memory location in the cache.

14. The method of claim 12 wherein the first operation of the identified instructions is performed in a first one of the stages of the pipeline and the cancellation condition occurs in a second one of the stages, and wherein the first stage occurs earlier in the sequence of stages than the second stage.

15. The method of claim 12 wherein said step of inhibiting prevents data from being written to the memory location during performance of the second operation.

16. The method of claim 14 wherein each of the identified instructions to be canceled proceeds through all of the pipeline stages at least up to, and including, the stage or stages in which the second operation is performed and writing into memory is inhibited.

17. The method of claim 10 wherein the computer processor further comprises:

a load buffer having a plurality of entries for storing load operations including the first operation of each of the identified instructions;

a store buffer having a plurality of entries for storing store operations, including the second operation of each of the identified instructions; and wherein each of said load buffer entries comprises a bit associated with the first and second operations of each of the identified instructions; and wherein each of said store buffer entries comprises a set of state bits associated with each of the first and second operations of the identified instructions.

18. The method of claim 17 wherein the load operations, including the first operations of the identified instructions, can be performed in a different sequence than the order in which they were received by the load buffer; and wherein store operations and second operations of the identified instructions must be performed in the order in which they are received by the store buffer.

* * * * *